United States Patent [19]

Mathers et al.

[11] Patent Number: 4,507,560
[45] Date of Patent: Mar. 26, 1985

[54] TERBIUM-ACTIVATED GADOLINIUM OXYSULFIDE X-RAY PHOSPHOR

[75] Inventors: James E. Mathers; Ramon L. Yale, both of Ulster, Pa.

[73] Assignee: GTE Products Corporation, Stamford, Conn.

[21] Appl. No.: 159,415

[22] Filed: Jun. 13, 1980

[51] Int. Cl.³ .............................................. H01J 1/62
[52] U.S. Cl. ............................... 250/483.1; 250/486.1
[58] Field of Search ............................... 250/483, 486; 252/301.4 R, 301.4 S

[56] References Cited

U.S. PATENT DOCUMENTS

| 3,872,309 | 3/1975 | De Belder et al. | 250/486 |
| 3,883,747 | 5/1975 | Murashige et al. | 250/483 |
| 4,090,085 | 5/1978 | Shimiya et al. | 250/483 |

Primary Examiner—Bruce C. Anderson
Attorney, Agent, or Firm—James Theodosopoulos

[57] ABSTRACT

An improved $(Gd_{1-x}Tb_x)_2O_2S$ X-ray phosphor, wherein x is from 0.0003 to 0.0045, and persistence causing impurity ions are kept below 5 ppm, exhibits increased brightness in the blue region of the spectrum, while exhibiting acceptably low persistence for X-ray intensifying screen applications.

4 Claims, 2 Drawing Figures

TERBIUM-ACTIVATED GADOLINIUM OXYSULFIDE X-RAY PHOSPHOR

CROSS REFERENCE TO RELATED APPLICATIONS

U.S. patent application Ser. No. 159,416, assigned to the present assignee, and filed concurrently herewith, relates to an improved terbium-activated gadolinium oxysulfide X-ray phosphor containing cerium.

BACKGROUND

This invention relates to a Tb-activated gadolinium oxysulfide $(Gd_{1-x}Tb_x)_2O_2S$ having improved emission in the blue region of the color spectrum, and acceptable decay characteristics for X-ray intensifier screen applications.

Tb-activated gadolinium oxysulfide (hereinafter sometimes referred to as "GOS:Tb" or "GOST") has been known to be useful as an X-ray-excited phosphor since at least the early 1970's, and as a cathode ray-excited phosphor prior to that time.

In "Evaulation of $Gd_2O_2S$:Tb As A Phosphor For The Input Screen Of X-Ray Image Intensifier," published in IEEE Transactions on Nuclear Science, 19(4), 3–8 (1972), Ludwig et al. compared screens of a GOS:Tb phosphor, containing 0.0008 mole fraction Tb, with conventional (ZnCd)S:Ag screens, and found the GOS:Tb screens to be brighter.

U.S. Pat. No. 3,725,704, issued to Buchanan et al. on Apr. 3, 1973, discloses an X-ray conversion screen including a GOS-Tb phosphor, wherein Tb concentration ranges from about 0.005 up to 8 percent of the Gd concentration. The patent teaches that the optimum concentration for Tb ranges from 0.03 to 3 percent, presumably based upon X-ray-to-light conversion efficiency as plotted in FIG. 3 of the patent.

In U.S. Pat. No. 3,705,858, issued to Luckey et al. on Dec. 12, 1972, there is disclosed a method for preparing lanthanide oxysulfides including GOS:Tb, wherein Tb is present in a mole fraction range of about 0.0001 to 0.10. The method is said to produce high efficiency, low lag phosphors useful, for example, in X-ray screens.

In "X-Ray Exposure Reduction Using Rare-Earth Oxysulfide Intensifying Screens", presented at a 1971 meeting of the Radiological Society of North America, and published in Radiology, 105(1), 185–90 (1972), Buchanan et al. pointed out that the blue emission of GOS:Tb could be enhanced by reducing Tb below its otherwise optimum value. Unfortunately, further investigations have shown that low Tb activator levels are often inexplicably accompanied by undesirable increases in persistence. (Persistence is a measure of the tendency for a phosphor to continue to emit radiation after excitation has ceased).

SUMMARY OF THE INVENTION

In accordance with the invention, an improved $(Gd_{1-x}Tb_x)_2O_2S$ phosphor exhibits increased emission in the blue region of the color spectrum, while also exhibiting acceptable decay characteristics for X-ray intensifying screen applications. According to the invention, x is maintained within the low-level range of about 0.0003 to 0.0045 mole fraction, and preferably about 0.0004 to 0.0035 mole fraction, while persistence causing impurity ions are kept below about 5 parts per million parts by weight of phosphor. Typical of such impurity ions are La, Pr, Eu, Ho, Tm, Sn, Ca, Ni, Fe, Pb, and Nd.

DETAILED DESCRIPTION OF THE INVENTION

Figure 2:
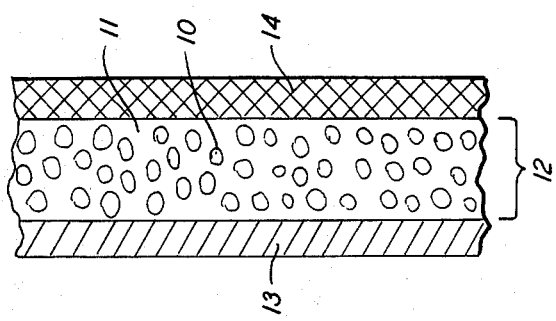
FIG. 2 is a cross section of one embodiment of an X-ray intensifying screen incorporating an X-ray phosphor of the invention.

The $(Gd_{1-x}Tb_x)_2O_2S$ phosphors of the invention may be prepared by firing a mixture of particulate starting materials in intimate contact at a temperature and for a time sufficient to yield the desired composition in the desired particle size range. Starting materials having the requisite final purity may be chosen, or in the alternative, impurities may be removed during processing.

While mechanical mixing of starting materials such as $Gd_2O_3$, $Tb_2O_3$, $Tb_4O_7$ and S with suitable fluxes (eg., alkali metal carbonates or phosphates) is suitable to achieve a homogeneous blend for firing to form the phosphor composition (so-called "direct firing"), the coprecipitation of salts of Gd and Tb from aqueous solution assures a homogeneous dispersion of low levels of Tb in Gd prior to mechanical blending with sulfur-containing starting materials. Such as "coprecipitation" technique also affords the opportunity to remove impurities by precipitation from aqueous solution.

The above-mentioned U.S. Pat. No. 3,705,858 describes a more complex preparation technique involving coprecipitation, in which a mixed rare earth sulfite precursor is obtained by the controlled introduction of two different solutions to a reaction solution, followed by conversion of the resulting precipitate to a phosphor by heating in reducing and inert atmospheres, respectively.

In general, both the direct fire technique and the coprecipitation techniques, when carefully followed, produce phosphors of comparable quality and characteristics.

Firing of the starting material blend or mixture is typically carried out in a non-oxidizing atmosphere at a temperature of from about 700° C. to 1300° C. for from about 1 to 8 hours.

Further details and advantages of the invention will now be illustrated by the following examples.

EXAMPLE I

A series of phosphor samples of $(Gd_{1-x}Tb_x)_2O_2S$ having varying Tb levels were prepared by blending in a glass jar with plastic beads particulate starting materials of gadolinium oxide, sulfur, sodium carbonate, sodium hydrogen phosphate and terbium oxide as in the approximate weights shown in Table I.

TABLE I

|  | Grams |
| --- | --- |
| $Gd_2O_3$ + $Tb_4O_7$ | 36.25 |
| S | 11.2 |
| $Na_2CO_3.H_2O$ | 14.88 |
| $Na_2HPO_4.H_2O$ | 2.84 |

The samples were then: fired in alumina crucibles with well fitting alumina covers at 2250° F. for 3 hours in an air atmosphere; washed in water until a neutral pH was indicated; washed in dilute nitric acid solution; washed again to neutral pH; dried; annealed for 2 hours at 525° C.; and sieved through a 400 mesh screen.

The samples were then measured for X-ray powder brightness as blue intensity of emission through a blue filter under 80 0 KVP X-ray excitation. Measurements were made using a General Electric portable industrial X-ray unit as the excitation source and a Gamma Model 2900 Auto-Photometer coupled to a Beckman 10-inch recorder as the measuring device.

The General Electric Portable Industrial X-ray Unit used is a Model LX-140. It operates at a fixed X-ray tube current of 2 ma and variable accelerating voltage from 70 to 140 kilovolts. The unit is housed in a 24×24×48 inch high lead-lined cabinet with safety interlock switches connected to the external control unit.

The Gamma Scientific Model 2900 Auto-Photometer is coupled to a S-11, end-on photomultiplier tube. An auxiliary output signal is fed to a Beckman 10-inch recorder which has full scale deflection of less than 0.5 second. The recorder has seven speeds—0.1,0.2,0.5,1,2, 5, and 10 inches per minute.

The phosphor is placed in a 1.3-cm hole in a 2.3-mm thick brass holder which is covered on one side by a plastic tape. The phosphor is spatulated smooth with the surface of the holder. The holder is placed on a stage located approximately 18-cm below the center line of the X-ray tube. This position is also approximately 9-cm below a 20-mm aluminium filter that intercepts the X-ray beam and simulates the density of the human body.

Figure 1:
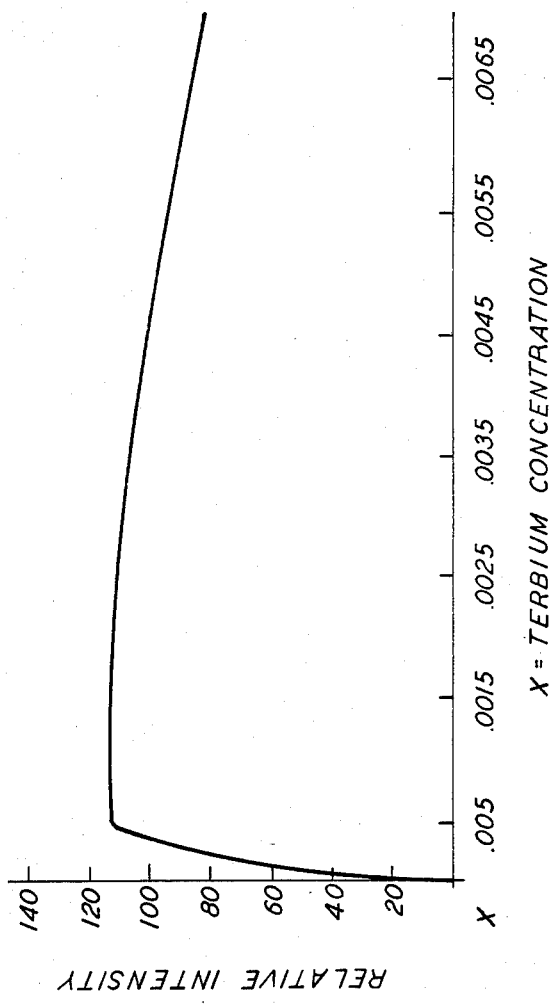
FIG. 1 is a plot of relative intensity of blue emissions of a $(Gd_{1-x}Tb_x)_2O_2S$ phosphor under X-ray excitation versus terbium concentration in mole fraction.

The light emitted by the phosphor is picked up by a fiber optic probe located about 1 cm from the surface of the phosphor and fed through a port in the side of the cabinet to the photomultiplier tube. The fiber optic is connected to the photomultiplier through an adapter that allows the use of various filters used in the measurement of color, brightness, and persistence. Results are shown in FIG. 1, which is a plot of relative intensity versus terbium concentration in mole fraction, that is, the value of x in the formula $(Gd_{1-x}Tb_x)_2O_2S$. As may be seen from the Figure, intensity first increases gradually with decreasing terbium concentration between the x values of 0.0070 and 0.0010, reaching a maximum at about 0.0010, then decreases slightly between about 0.0010 and 0.0005, and finally decreases fairly rapidly thereafter (between 0.0005 and zero).

EXAMPLE II

A series of $(Gd_{1-x}Tb_x)_2O_2S$ samples having varying Tb levels were prepared by blending starting materials in a glass jar with plastic beads. The starting materials had the weight ratios shown in Table II.

TABLE II

| | |
|---|---|
| $Gd_2O_3$ + $Tb_4O_7$ | 1.000 |
| S | 0.307 |
| $Na_2CO_3.H_2O$ | 0.410 |
| $Na_2HPO_4.H_2O$ | 0.078 |

The blended starting materials were roller milled for two hours. The samples were then: fired in alumina crucibles with well fitting alumina covers at 1235° C. for 8 hours in an air atmosphere. Resultant fired cakes were crushed and wet milled for 40 minutes, washed in water until a neutral pH was indicated; washed in dilute nitric acid solution; washed again to neutral pH; dried; annealed for 2 hours at 525° C.; and screened through a 400 mesh screen.

The samples were then measured for X-ray powder brightness as blue intensity of emission through a blue filter and persistence under 80 KVP X-ray excitation. In the measurement of persistence, a "standard" phosphor sample is placed on the stage. A 1 log.neutral density filter is placed in the holder and, with the shutter open, the sample is excited for 10 sec. at 80 KVP (kilovolts peak). The resultant emission level is adjusted to nearly full scale chart deflection with the range switch on "Auto" and the indicator reading "O" scale by adjusting the photomultiplier anode voltage. Next, the 1 log N.D. filter is replaced by a 0.0 log N.D. filter and subsequent samples are excited for 10 seconds with the photomultiplier shutter closed. As soon as the X-ray tube kicks off, the photomultiplier shutter is opened and with the recorder set at 5 inches/minute, a trace is made at the resultant decaying emission. The average persistence is recorded for one minute. The recorder trace is then measured to 10,20,30, etc., seconds after "cutoff" and the signal height measured at these points. The persistence is then recorded as the "Percent of Standard at Full Excitation at a Specified Time Increment, i.e., 30 sec." The X-ray source was a Philips X-ray generator; Philips FAA 100/3.5 tube with a tungsten target.

Results are shown in Table III.

TABLE III

| | Tb Concentration (mole fraction) | | | |
|---|---|---|---|---|
| | 0.0010 | 0.0015 | 0.0020 | 0.0025 |
| X-ray Powder Brightness | 133 | 131 | 130 | 128 |
| Persistence ($\times 10^{-3}$) | 2.7 | 2.6 | 2.6 | 2.2 |

Again, it is seen that brightness increases with decreasing terbium concentration. Persistence is within an acceptable range for X-ray intensifier screen applications.

Table IV shows the amounts of persistence causing impurity ions in the $Gd_2O_3$ starting material in parts per million. (Negligible amounts of such impurities, that is, less than 1 parts per million, total, were present in the other starting materials.)

TABLE IV

| | La | Pr | Nd | Sm | Eu | Dy | Ho | Er | Tm | Yb | Lu | Y | Total |
|---|---|---|---|---|---|---|---|---|---|---|---|---|---|
| ppm | <5 | <1 | <5 | <5 | <1 | <5 | <1 | 10 | <5 | <10 | <10 | 2 | <60 |

Referring now to FIG. 2, there is shown a crosssection view of one embodiment of an X-ray intensifier screen employing a phosphor composition of the invention, wherein phosphor particles 10 are held together by a light transparent binder 11 to form a layer 12. The binder is typically an organic resin or plastic, but could also be a glass. The average particle size of the phosphor particles 10 may range between 2 and 20 microns, as measured by Fisher Sub Sieve Sizer, while the thickness of layer 12 may be 1 mil to 20 mils depending upon the particular application, as is known in the art. Supporting substrate 13, depending again on the application, may be plastic, glass or a reflective metal such as aluminum. Layer 14 is a protective layer or film, which must of course also be transparent to the radiation of interest. In operation, incoming X-rays pass through layer 14 and strike particles of phosphor 10, exciting emissions of visible radiation, which visible radiation acts upon an adjacent silver halide emulsion film, not shown, to form a latent photographic image, which is subsequently developed. Use of the improved screen of the invention with a film having sensitivity in the blue region of the visible spectrum would enable shorter exposure times of patients to X-rays than required with screens using prior art GOS:Tb phosphors.

While there have been shown and described what are at present considered the preferred embodiments of the invention, it will be obvious to those skilled in the art that various changes and modifications may be made therein without departing from the scope of the invention as defined by the appended claims.

We claim:

1. An X-ray phosphor having high emission in the blue region of the color spectrum with relatively low persistence, having the formula $(Gd_{1-x}Tb_x)_2O_2S$, wherein x is within the range of about 0.0003 to about 0.0045, and wherein persistence causing impurity ions are below about 5 parts per million parts by weight of the phosphor.

2. An X-ray intensifying screen comprising a substrate, a screen layer on the substrate comprising particles of an X-ray phosphor in a binder, and a protective layer on the screen layer, wherein the X-ray phosphor has high emission in the blue region of the color spectrum with relatively low persistence and has the molar formula $(Gd_{1-x}Tb_x)_2O_2S$, and x is within the range of about 0.0003 to about 0.0045 and wherein persistence causing impurity ions are below about 5 parts per million parts by weight of phosphor.

3. An X-ray phosphor having high emission in the blue region of the color spectrum with relatively low persistence, having the formula $(Gd_{1-x}Tb_x)_2O_2S$, wherein x is about 0.001.

4. An X-ray intensifying screen comprising a substrate, a screen layer on the substrate comprising particles of an X-ray phosphor in a binder, and a protective layer on the screen layer, wherein the X-ray phosphor has high emission in the blue region of the color spectrum with relatively low persistence and has the molar formula $(Gd_{1-x}Tb_x)_2O_2S$, wherein x is about 0.001.

* * * * *